(No Model.)
G. H. SMITH.
SALT EVAPORATING PAN.
No. 321,456. Patented July 7, 1885.
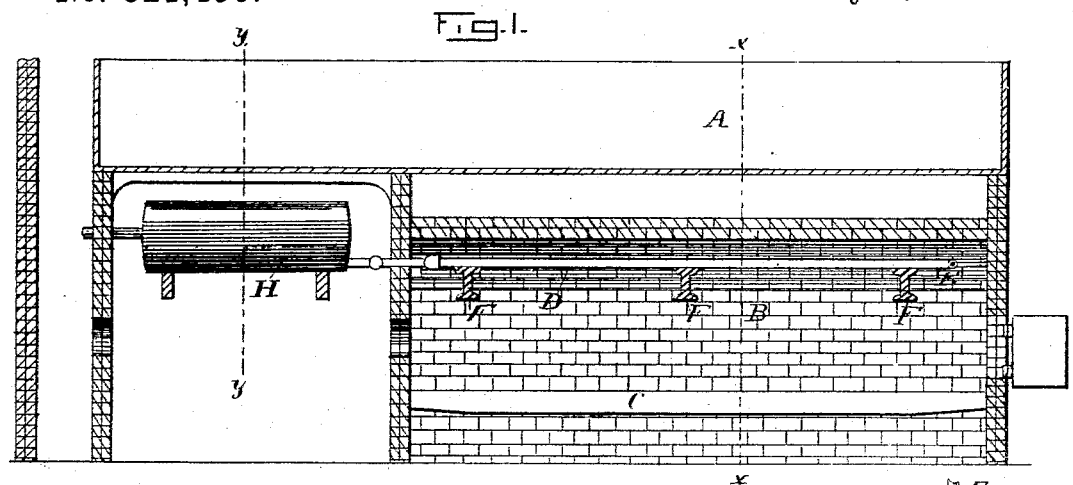
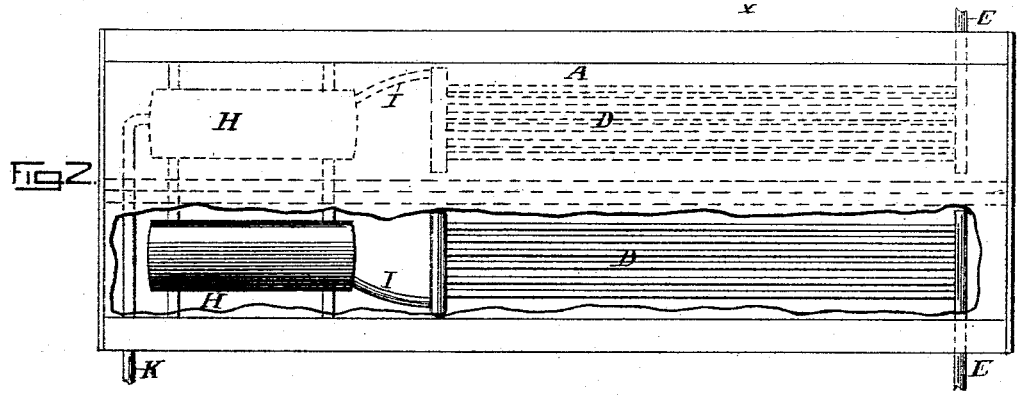
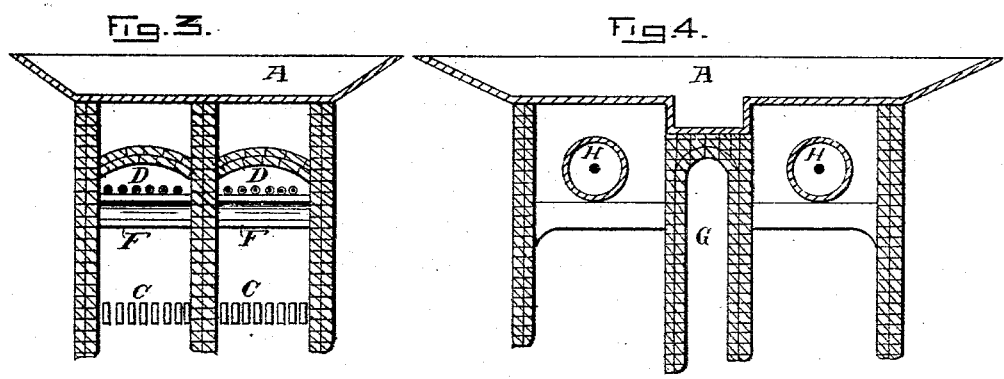
WITNESSES:
Norris A. Clark.
F. W. Brawner.
INVENTOR:
George H. Smith.
By W. A. Bartlett
His atty

UNITED STATES PATENT OFFICE.

GEORGE H. SMITH, OF NEW YORK, N. Y.

SALT-EVAPORATING PAN.

SPECIFICATION forming part of Letters Patent No. 321,456, dated July 7, 1885.

Application filed December 19, 1884. (No model.)

*To all whom it may concern:*

Be it known that I, GEORGE H. SMITH, residing at New York, in the county of New York and State of New York, have invented certain new and useful Improvements in Salt-Evaporating Pans, of which the following is a specification, reference being had therein to the accompanying drawings.

This invention relates to evaporating-pans for salt-making; and it consists in the details of construction and combination of parts, as hereinafter pointed out and claimed.

The object of the invention is to protect the bottom of the salt-pan from too intense heat to the detriment of the product; also, to utilize as far as possible all the heat of the furnace; also, to combine with an evaporating-pan a steam-generating apparatus; also, to utilize heat developed for the purpose of evaporating brine for the further object of drying the crystallized salt.

In the drawings forming a part of this specification, Figure 1 is a longitudinal elevation, partly sectioned, of a salt-evaporating pan with steam-generating attachment. Fig. 2 is a plan of the same. Fig. 3 is a cross-section on the line $x\,x$, Fig. 1; and Fig. 4 is a cross-section on line $y\,y$, Fig. 1, showing a modification which may be adopted for the entire length of the pan.

A represents a salt-evaporating pan, of usual construction, supported on brick-work. The furnace B may be arched over at top, as shown in the drawings; or the brick arch may be omitted.

Above the grate-bars C C, at such height as to give a proper furnace-space, I place pipes D, which preferably extend lengthwise of the pan, but may extend from side to side. These pipes are supported by cross-bars F, or in other suitable manner, and are supplied with fresh water through a supply-pipe, E. The water may be forced into the pipes either by a pump or injector.

The water-pipes D, being in close proximity to the fire, are subject to intense heat, and steam will be developed in the same with great rapidity. The pipes also serve to shield the bottom of the pan from the too intense heat of the furnace.

I prefer that the pan be supported by a central support of brick-work, as in my Patent No. 287,183, whether it does or does not have the central trough. A chamber in this brick-work, as shown at G, Fig. 4, can be utilized as a drying-oven for salt, the salt being conveyed through the oven, preferably by a mechanical conveyer, from end to end.

To the rear of the furnace proper, or in other convenient location, I place drums or boilers H, into which the steam generated in pipes D is conveyed through pipes I, which pipes may be supplied with check-valves. These drums H are preferably under the pan, in which location they will be protected from radiation; but they may be outside the brick-work.

The steam is conveyed from drums or reservoirs H by pipe K, which leads to a grainer or to an engine, where the steam is utilized.

By the above construction I am enabled to modify the heat developed by the furnaces so that the salt shall not be "burned" in the pans. I may also, where a sufficient number of pipes are employed, dispense with the arches of fire-brick over the furnaces and under the pan.

The same arrangement of pipes and steam-drums may be applied to a "kettle-block" for evaporating brine, the tubes being applied under the kettles in the same manner as under a pan.

Where a pan is used, the pipes may be made to support the pan.

I claim—

1. The combination, with a salt-evaporating pan or its equivalent, and a furnace the heat from which comes in contact with some part of the bottom of the pan, of a series of water-pipes under said pan, a fresh-water-supply pipe leading into said pipes, and a pipe leading from the series to the place of its utilization away from the pan, as set forth.

2. In combination with a salt-evaporating pan, a series of fresh-water pipes between the bottom of the pan and the furnace-bars, said pipes having no entrance into or communication with the pan, and a collecting-drum for steam connected to said series of pipes and in the rear thereof under the evaporating-pan.

3. The combination, with a salt-evaporating pan, of an arch of brick-work forming the crown of the furnace under said pan, and a series of fresh-water pipes under the crown of the arch, and resting on suitable supports, substantially as stated.

4. The combination, with an evaporating-pan, of a central brick-work support, said brick-work being hollow and forming a drying oven or kiln under the pan, as set forth.

5. The combination, with the furnace of a salt-evaporating pan, of a steam-generating apparatus interposed between the grating and the pan, and having no communication with said pan, and a pipe leading from said steam-generator to a place of utilization of said steam away from the pan, as set forth.

In testimony whereof I affix my signature in presence of two witnesses.

GEORGE H. SMITH.

Witnesses:
WM. M. BURNS,
D. E. CULVER.